United States Patent
Martinez, Jr. et al.

(10) Patent No.: US 6,947,822 B2
(45) Date of Patent: Sep. 20, 2005

(54) CONTROL OF MULTIPLE ELECTRONICALLY CONTROLLED COMPONENTS

(75) Inventors: Antonio Martinez, Jr., Chicago, IL (US); Joseph A. Fanella, Carpentersville, IL (US); David M. Hsia, Glendale Heights, IL (US); Kenneth E. Rhone, Aurora, IL (US); Raymond G. Darda, Brookfield, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 478 days.

(21) Appl. No.: 10/281,839

(22) Filed: Oct. 28, 2002

(65) Prior Publication Data

US 2004/0080896 A1 Apr. 29, 2004

(51) Int. Cl.[7] ............................................. G06F 19/00
(52) U.S. Cl. ...................... 701/102; 701/108; 701/115; 123/568.2; 123/568.21
(58) Field of Search ................................ 701/102, 108, 701/115; 123/568.2, 568.21, 568.22, 568.23, 568.24, 568.25

(56) References Cited

U.S. PATENT DOCUMENTS

| | | | | |
|---|---|---|---|---|
| 6,386,154 B1 | * | 5/2002 | Hellman et al. | 123/58.8 |
| 6,422,219 B1 | * | 7/2002 | Savonen et al. | 123/568.12 |
| 6,588,210 B2 | * | 7/2003 | Kreso | 60/602 |

* cited by examiner

Primary Examiner—Tony M. Argenbright
Assistant Examiner—Johnny H. Hoang
(74) Attorney, Agent, or Firm—Susan L. Lukasik; Dennis Kelly Sullivan; Jeffrey P. Calfa

(57) ABSTRACT

An apparatus for and method of controlling multiple electronically controlled components (101) utilizes a controller (103) that controls one of the components (101A). A control interface (211) replicates the control signal (201) generated by the controller (103) for each additional component (101B through 101E), such that the replicated signal bears significant resemblance to the original control signal with respect to current, voltage, and pulse width. The replicated signals are provided to the additional components (101B through 101E) at substantially the same time as the control signal (201) is provided to the first component (101A).

19 Claims, 4 Drawing Sheets

CONTROL OF MULTIPLE ELECTRONICALLY CONTROLLED COMPONENTS

FIELD OF THE INVENTION

This invention relates to electronically controlled components, including but not limited to control of multiple electronically controlled components, such as exhaust gas recirculation (EGR) valves.

BACKGROUND OF THE INVENTION

Electronically controlled components are known. A block diagram of a system having a component that is electronically controlled by a controller is shown in FIG. 1. For example, one or more components 101 may be electronically controlled by an engine control module (ECM) 103 of an internal combustion engine 105. The electronically controlled component 101 may interact with other components 107 and 111 via physical and/or electrical interfaces 109 and 113, respectively. The other components 107 and 111 may or may not also be electronically controlled. For example, the electronically controlled component 101 may be an exhaust gas recirculation (EGR) valve that interfaces with other components 107 and 109 such as an EGR cooler outlet and an intake manifold inlet for an engine 105.

As the assemblies in which electronically controlled components become more complex, utilizing multiple electronically controlled components to provide the same function becomes a necessity. Nevertheless, the controller, i.e., the source of the control, such as an ECM, for the electronically controlled components may not be able to source more than one electronically controlled component at a time due to physical or electrical constraints. Increasing the complexity of the controller by adding new outputs to the controller may not be possible due to limited output capability or may be too costly.

Accordingly, there is a need for a method and apparatus to control multiple electronically controlled components without adding unnecessary complexity or cost.

SUMMARY OF THE INVENTION

A method and apparatus for controlling multiple electronically controlled components includes providing, from a first source and to a first electronically controlled component, a control signal having a predetermined current at a predetermined voltage. A second source generates current sufficient to supply the predetermined current at the predetermined voltage to one or more additional electronically controlled components. The control signal is replicated, thereby generating one or more replicated control signals, one for each of the N additional electronically controlled components. The predetermined current at the predetermined voltage is applied as one of the replicated controls signals to each of the additional electronically controlled components at substantially the same time that the control signal is provided to the first electronically controlled component.

DESCRIPTION OF A PREFERRED EMBODIMENT

Figure 1:
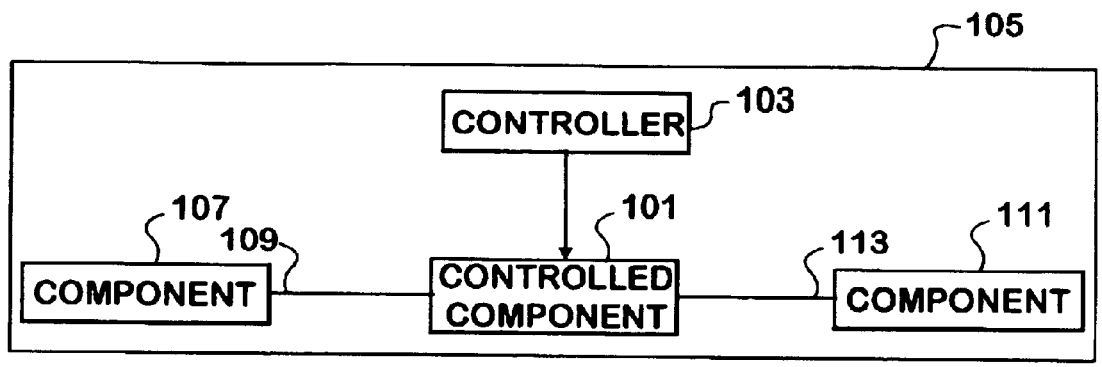
FIG. 1 is a block diagram of a system having an electronically controlled component.

The following describes an apparatus for and method of controlling multiple electronically controlled components without modifying the components or the controller that controls one of the components. A control interface replicates the control signal generated by the controller for each additional component, such that the replicated signal bears significant resemblance to the original control signal with respect to current, voltage, and pulse width. The replicated signals are provided to the additional components at substantially the same time as the control signal is provided to the first component.

By way of example when referring to the drawings in FIG. 2 through FIG. 5, the controlled components 101 are EGR valves 101, the controller 103 is an ECM 103, the system 105 is an internal combustion engine 105, and the EGR valve 101 is operably coupled to two components 107 and 111, an EGR cooler 107 and an intake manifold inlet 111. The interfaces 109 and 113 are physical interfaces, and may vary as shown in the figures.

Figure 2:
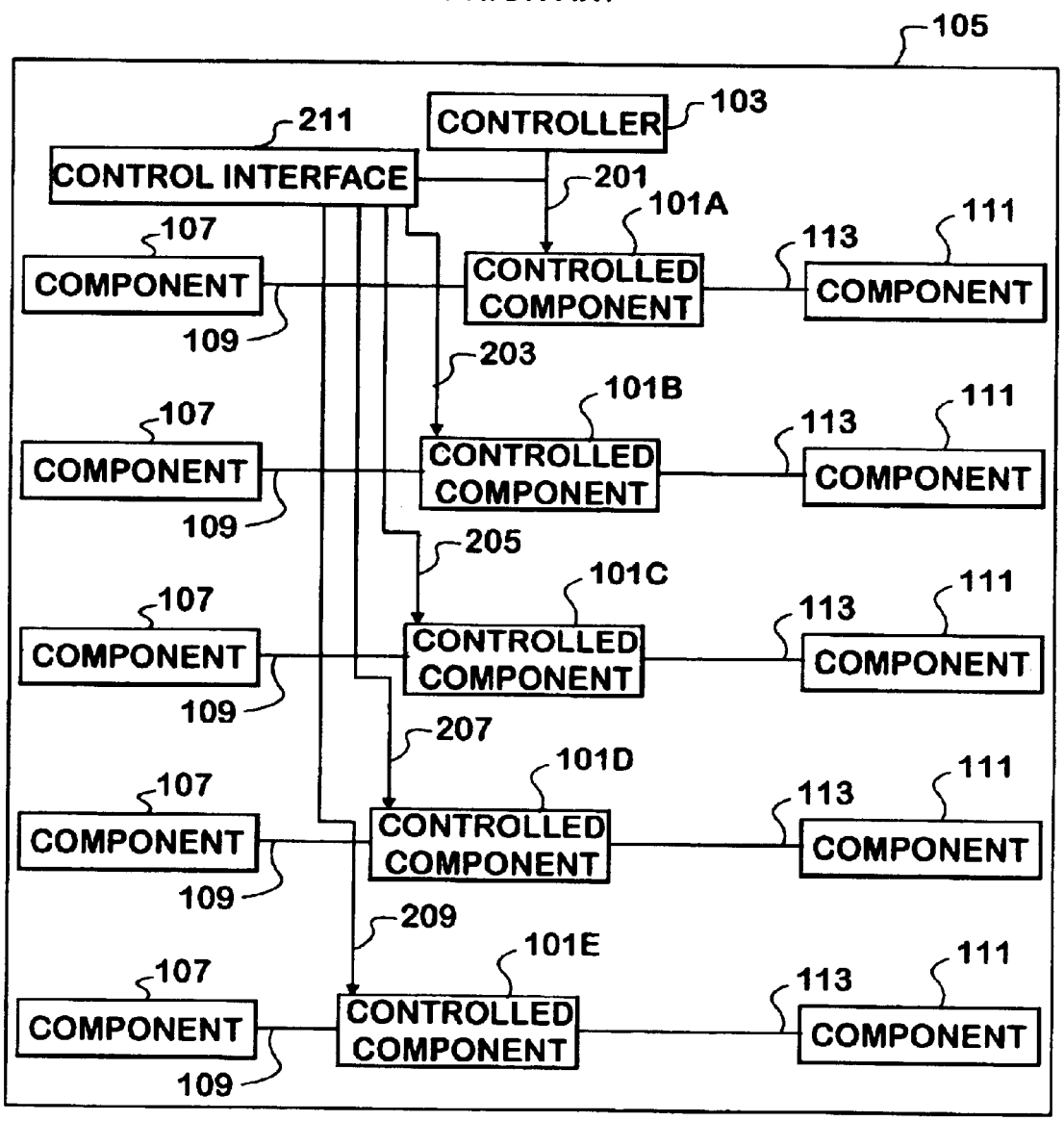
FIG. 2 is a block diagram of a system having multiple electronically controlled components in parallel with multiple sets of other system components in accordance with the invention.

A block diagram of a system having multiple electronically controlled components in parallel with multiple sets of other system components is shown in FIG. 2. In this example, five electronically controlled components 101A through 101E are shown, each having interfaces 109 and 113 to two other components 107 and 111, respectively. The interfaces may be physical and/or electrical. When the controlled component 101 is an EGR valve 101 in this example, each EGR valve 101 is physically connected to its own EGR cooler 107 and intake manifold inlet 111, as known in the art. Such an arrangement may be used, for example, when multiple independent systems, such as EGR systems, are utilized, although common component control is desired. This arrangement may also be utilized to simultaneously test multiple components 101, such as EGR valves 101 in multiple EGR systems in one engine or in a single EGR system in multiple engines. In this case, each component group 101, 107, 109, 111, and 113 resides in its own system 105 (not shown).

One of the components 101A is controlled by the controller 103 via a control signal 201 that is provided between the controller 103 and the controlled component 101 as known in the art. In this example, the ECM 103 sends its control signal 201 to the first EGR valve 101A, which is coupled with the ECM 103 as previously known. Each of the remaining components 101B through 101E, e.g., EGR valves 101, receives a control signal 203, 205, 207, or 209, respectively, from a control interface 211 that generates an appropriate voltage, current, and control signal 203, 205, 207, or 209 for each of the components 101B through 101E. The control interface 211 replicates the control signal 201 without significantly interfering with it or compromising the electrical application of the control signal 201 to the component 101.

Figure 3:
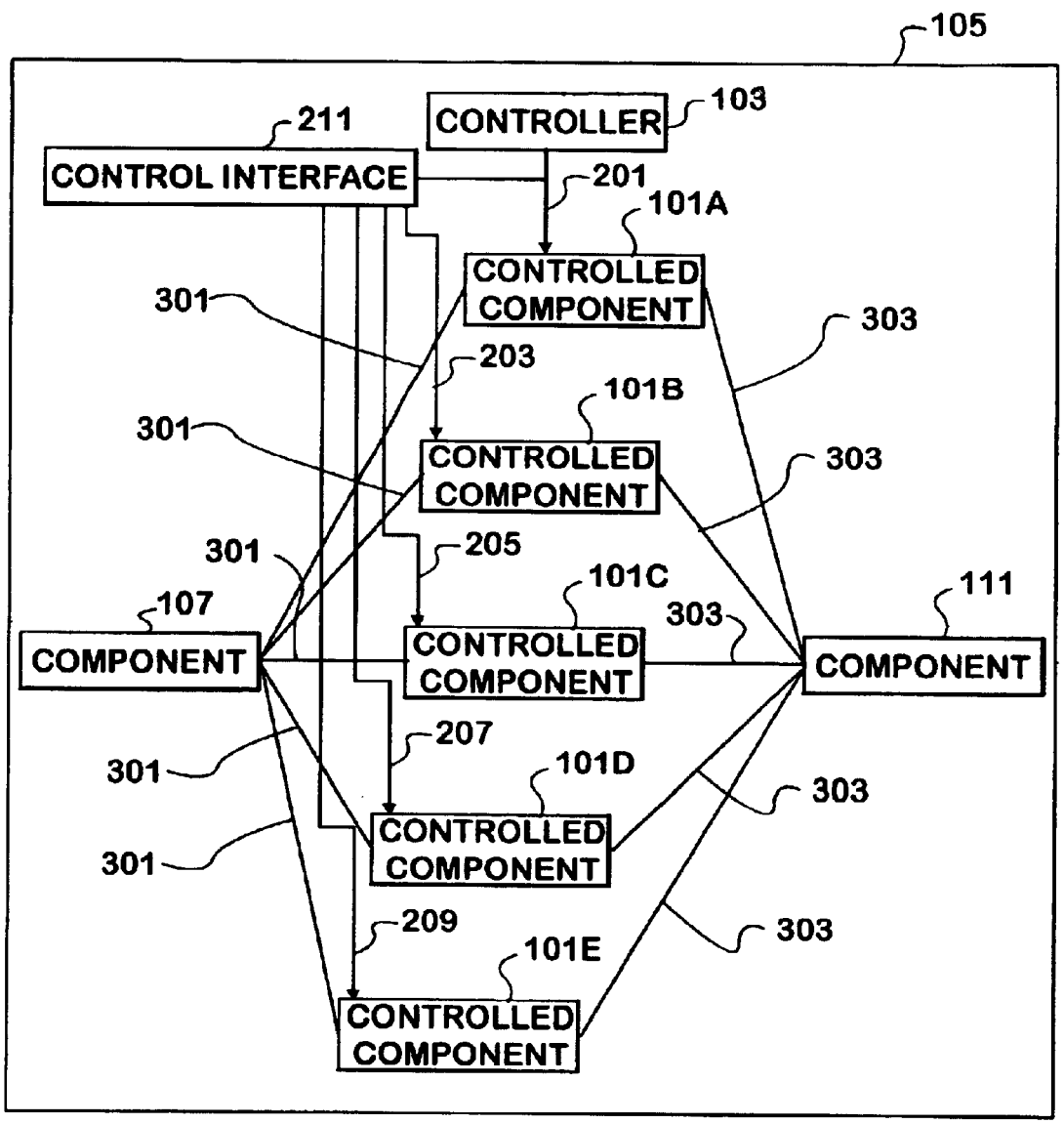
FIG. 3 is a block diagram of a system having multiple electronically controlled components in parallel with other system components in accordance with the invention.

A block diagram of a system having multiple electronically controlled components in parallel with other system components is shown in FIG. 3. In this example, multiple electronically controlled components are in parallel with each of two other components 107 and 111. For example, five EGR valves 101 are each connected via a physical interface 301, such as a plurality of pipes, to one EGR cooler 107. Similarly, the five EGR valves 101 are each connected via a physical interface 303, such as a plurality of pipes, to one intake manifold inlet 111. Such an arrangement may be used, for example, when one or more backup or hot-standby components 101 are utilized. A single EGR system may be utilized and backup or hot-standby EGR valve(s) 101B through 101E are installed with common EGR valve control. In this case, the control interface 211 sends an always open or always closed signal to the backup or hot-standby EGR valve(s) 101, depending on their physical installation, when they are not in use; and when they are in use, the control interface 211 replicates the ECM 103 control signal and sends it to the appropriate EGR valve 101. In this situation, the control interface 211 may also provide signals to select and/or deselect the backup or hot-standby components 101B through 101E. This arrangement may also be utilized to simultaneously test multiple components 101, such as EGR valves 101.

Figure 4:
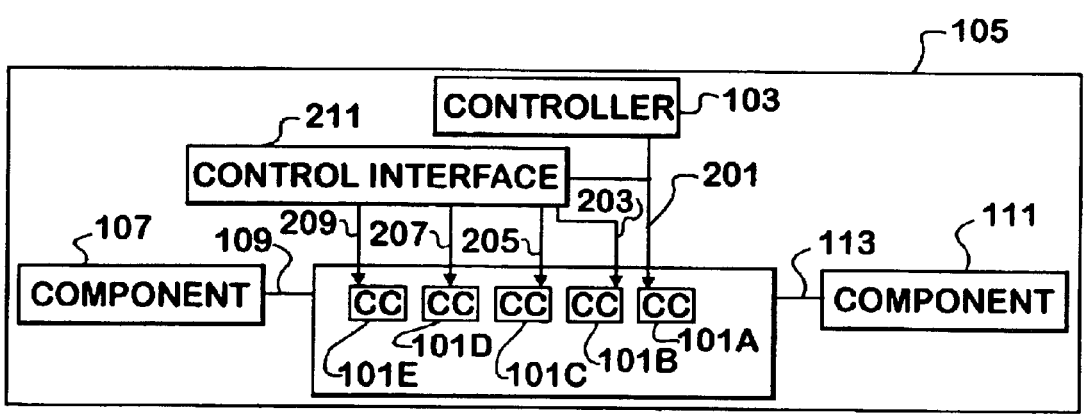
FIG. 4 is a block diagram of a system having multiple electronically controlled components in series with other system components in accordance with the invention.

A block diagram of a system having multiple electronically controlled components in series with other system components is shown in FIG. 4. Five components 101A through 101E are shown in serial relation to one another and interfaced to other components 107 and 111. The controller 103 provides a control signal 201 to the first component 101A and the control interface 211 provides control signals 203, 205, 207, and 209 for the remaining components 101B through 101D, respectively. For example, five EGR valves 101 may be inserted in the flow path between the EGR cooler 107 and the intake manifold 111 in a single engine 105. This arrangement may be utilized to simultaneously test multiple components 101, such as EGR valves 101, in various tests, including accelerated life tests and other tests, such as time consuming tests and so forth. Such an arrangement may also be useful in making side-by-side comparisons of similar components, such as EGR valves from different manufacturers.

Although FIG. 2 through FIG. 4 illustrate various relations between components, other relations between components fall within the scope of the present invention. For example, a combination of FIG. 2 and FIG. 3 results in a single first component 107 operably coupled to each of the plurality of controlled components 101, and each of the plurality of controlled components 101 is coupled to its own second component 111. This situation may occur, for example, when a single EGR cooler 107 is output to a plurality of EGR valves, each having its own intake manifold outlet. Various other combinations of serial and/or parallel interfaces are possible.

Figure 5:
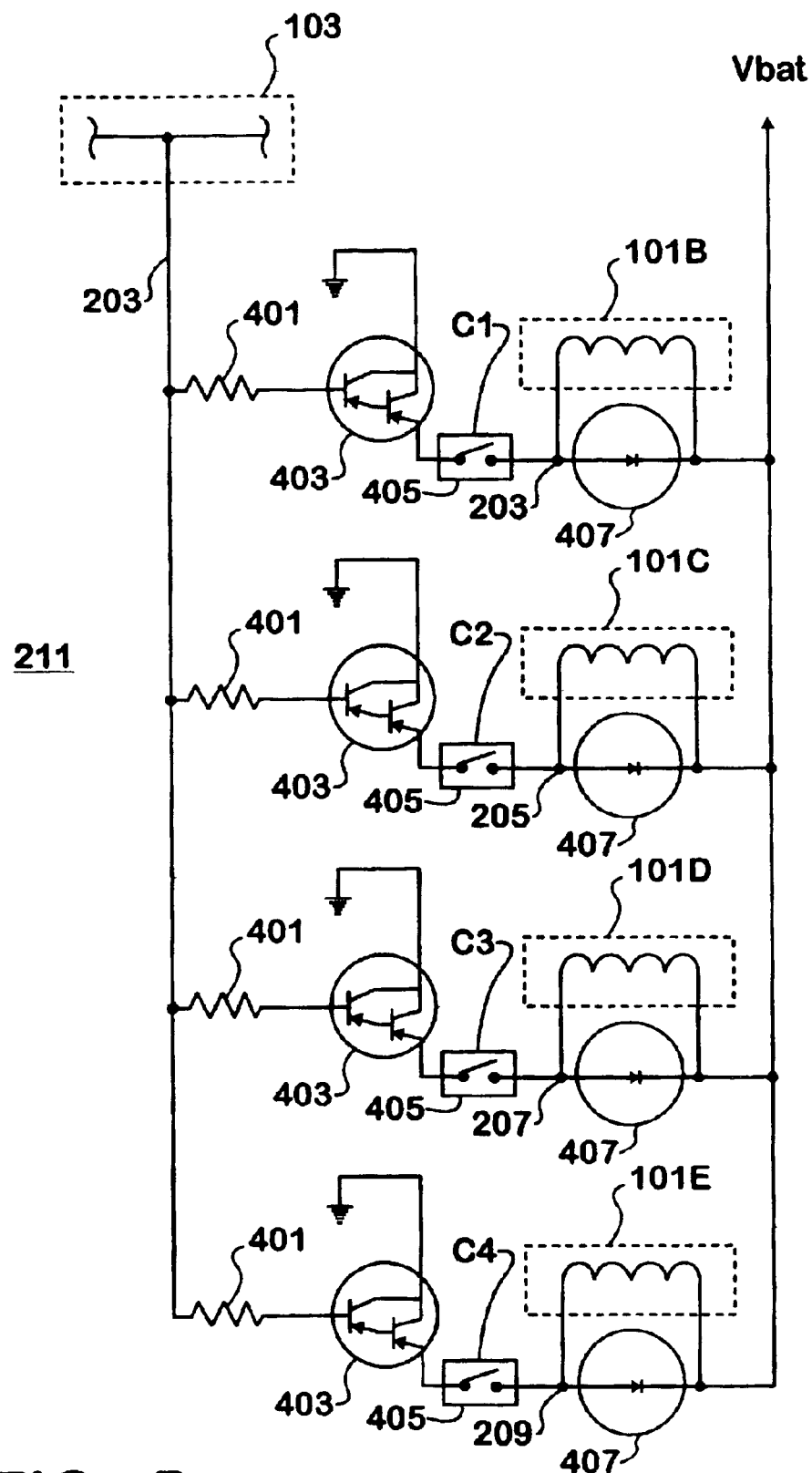
FIG. 5 is a schematic diagram of a control interface that repeats control signals for multiple electronically controlled components in accordance with the invention.

A schematic diagram of an interface that repeats control signals for multiple electronically controlled components is shown in FIG. 5. One signal repeater is provided in parallel for each of the controlled components 101B through 101E. Each signal repeater replicates or duplicates the control signal 201 provided to the first component 101A for each additional controlled components 101B through 101E. The control signal 201 is duplicated in amplitude and duration to produce the control signals 203, 205, 207, and 209 for the remaining components 101B through 101E.

In the example where multiple EGR valves 101 are being controlled, the control signal 201 is a pulse width modulated signal that has an amplitude that controls how much current is directed to the EGR valve and a width that controls how open the valve is. For example, when the control signal 201 pulse is at its maximum pulse width, the valve is open 100%. When the control signal 201 pulse is at half of its maximum pulse width, the valve is open 50%. When no pulse is sent, the valve is closed. Insignificant delays in this application are introduced by the signal repeater, thus the duplicated control signals 203, 205, 207, and 209 arrive at their respective components 101B through 101E at substantially the same time as the control signal 201 reaches the first component 101A. The signal repeaters do not inhibit or degrade the control signal 201 in a significant way.

Each signal repeater is comprised as follows. The control signal 201 from the controller 103 is input to a resistor 201, such as a 1 kΩ resistor, in series with a Darlington transistor pair 403. The Darlington transistor pair 403 may be, for example, a TIP 125 PNP silicon Darlington power transistor, rated at 60 V, 5 A, and 65 W.

A switch 405, such as a transistor or other known switch, is optionally placed in series between the Darlington transistor pair 403 and the controlled component 101. Each switch 405 is controlled by one signal C1, C2, C3, or C4, which controls whether or not the particular controlled component 101B through 101E is active. The switch 405 may be utilized, for example, in backup or hot-standby situations. The appropriate control signal(s) C1, C2, C3, and/or C4 are utilized to select (activate) and/or deselect (deactivate) a backup or hot-standby component 101B through 101D. When a switch 405 is not utilized, a short circuit, e.g., a wire, replaces the switch 405.

A regulator 407, such as a diode, in parallel with the controlled component 101, provides voltage regulation. The components 101 may be inductive components, such as with the example of the EGR valve. When inductive components are active, they store energy. When a particular component 101 is not being driven, the regulator 407, in this example a freewheeling or recirculation diode, dissipates the stored energy to prevent the remainder of the circuit 401, 403, and 405 from being damaged by inductive kick from the stored energy. Use of a recirculation diode prevents control of the components 101 from being compromised when component inductance is high. The regulator 407 may be a Zener voltage regulator diode, such as a 1N5362 Zener voltage regulator diode readily available in the industry.

A power source, Vbat, provides a predetermined amount of current at a predetermined voltage to each of the controlled components 101B through 101E at the same time when the control signal 201 provides a predetermined amount of current at a predetermined voltage to the first controlled component 101A. Thus, the power source must be able to supply sufficient current for each of the electronically controlled components, e.g., the five components 101B through 101E, while maintaining the desired voltage. When more components 101 are to be driven, the power source should be modified accordingly. Proper wiring and fuses rated for the current and voltage provided by the power source should also be utilized, as known in the art. The power source may be, for example, a battery designed for use in a vehicle driven by an internal combustion engine.

Figure 6:
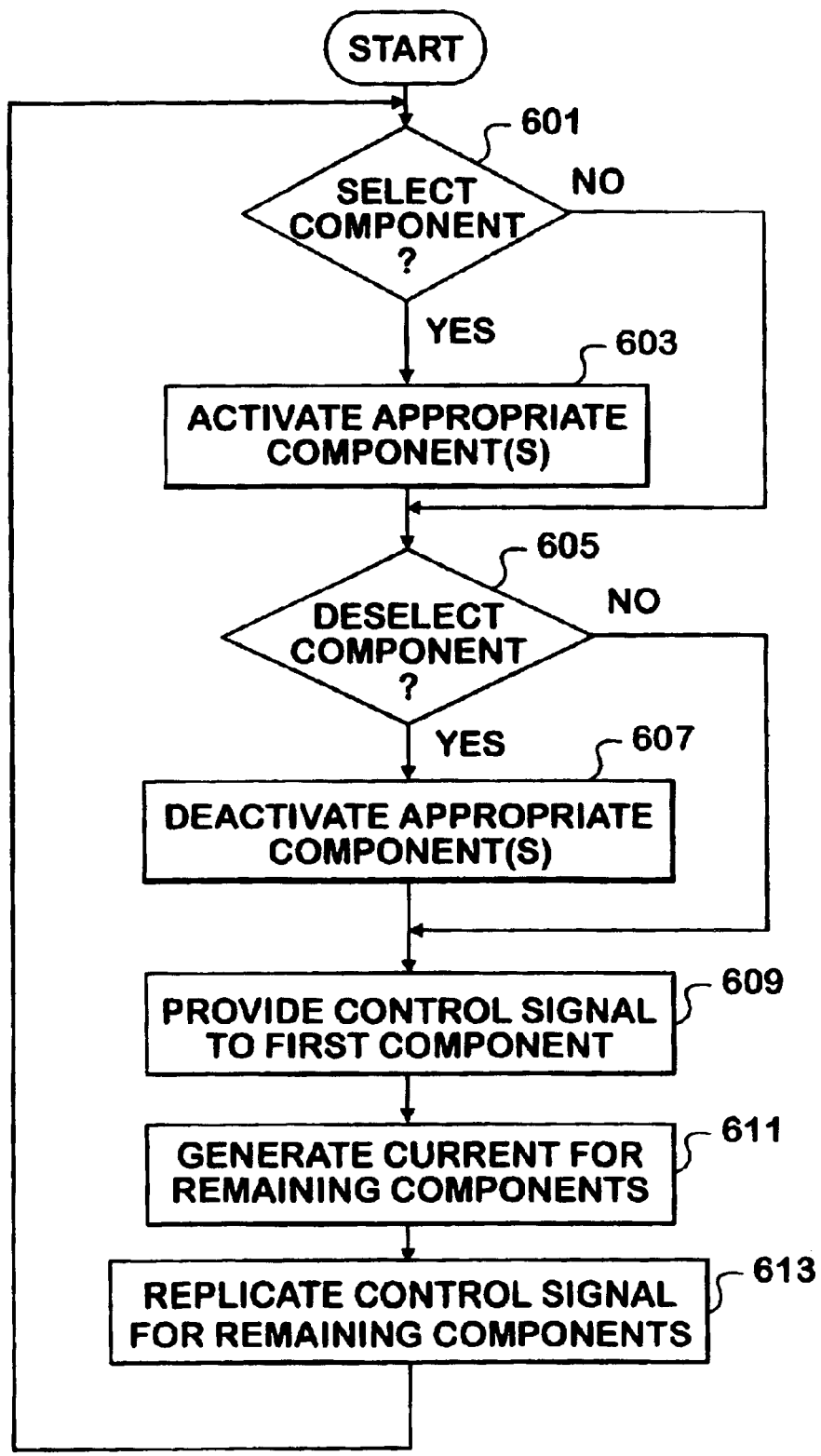
FIG. 6 is a flowchart that illustrates a method of repeating control signals for multiple electronically controlled components in accordance with the invention.

A flowchart that illustrates a method of repeating control signals for multiple electronically controlled components is shown in FIG. 6. The method is performed by the control interface 111.

If at step 601 it is desired to select or activate one or more of the electronically controlled components 101B through 101E, the process continues with step 603, where the appropriate components are activated using any of signals C1 through C4 as shown in FIG. 5. One or more previously inactive components are thus activated. If at step 601 no component 101 is to be activated, the process continues with step 605. If at step 605 it is desired to deselect or deactivate one or more of the electronically controlled components 101B through 101E, the process continues with step 607, where the appropriate components are deactivated using any of signals C1 through C4 as shown in FIG. 5. One or more previously active components are thus deactivated. If at step 605 no component 101 is to be deactivated, the process continues with step 609. Steps 601 through 607 are optional steps that may be performed, for example, for use with backup or hot-standby components.

At step 609, the control signal 201 is provided to the first component 101A. The control signal 201 is provided from the controller 103 to the first electronically controlled component 101A as a current with a predetermined amplitude at a predetermined voltage. At step 611, a power source, such as shown in FIG. 5, generates sufficient current to supply the predetermined current at the predetermined voltage to the remaining electronically controlled components 101B through 101E. At step 613, the control signal is replicated for each of the remaining electronically controlled components 101B through 101E. The replicated control signals provide the predetermined current at the predetermined voltage for each of the remaining electronically controlled components 101B through 101E at substantially the same time that the control signal 201 is provided to the first electronically controlled component 101A.

The present invention provides the capability of common control for multiple electronically controlled components without the need to modify the electronically controlled components. The controller that provides a basic control signal need not be changed, as an interface duplicates the control signal for the electronically controlled components without interfering with the controller's signal to one of the electronically controlled components. The present invention is successfully applied with many different interfaces between the electronically controlled components and other components. The present invention does not require additional microprocessor resources because all of the components are drivable from one control signal.

Although the above description describes the present invention via examples utilizing a particular type of component, a specific number of electronically controlled components, a specific number of interfaces to other components, particular component applications, specific component interfaces, and a specified control signal character, the present invention may be applied to systems having different types of components, any number of electronically controlled components, any number of interfaces to other components, various component applications, various component interfaces, and various different control signal characters. Further, although specific values and/or part numbers of resistors, transistors, and diodes are described, other values and/or part numbers may be utilized, depending on the application, without departing from the spirit of the invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A system comprising:
   a control signal operably coupled to a first electronically controlled component of N+1 electronically controlled components, where N is an integer greater than or equal to 1;
   N signal repeaters, each having an input sourced by the control signal and each generating a repeated control signal;
   N regulators, each having an output, each having an input sourced by one of the N repeated control signals, and each connectable in parallel with one of N electronically controlled components of the N+1 electronically controlled components, wherein the first electronically controlled component is not one of the N electronically controlled components;
   a power source, operably coupled to each output of the N regulators, and capable of providing a predetermined amount of current to each of the N electronically controlled components;
   wherein the predetermined amount of current is provided to each of the N electronically controlled components at substantially the same time that the control signal is provided to the first electronically controlled component.

2. The system of claim 1, wherein each of the electronically controlled components is a valve, wherein the control signal is a pulse width modulated signal having an amplitude and a width, wherein the amplitude of the control signal represents the predetermined amount of current, and wherein the width of the control signal represents how open the valve is.

3. The system of claim 1, wherein the control signal provides a substantially fixed voltage at a substantially fixed current for a time period determined by an engine control module in an internal combustion engine.

4. The system of claim 1, wherein the N+1 electronically controlled components have a serial interface with each other.

5. The system of claim 4, wherein the serial interface is physical.

6. The system of claim 1, wherein the N+1 electronically controlled components have a parallel interface with each other.

7. The system of claim 6, wherein the parallel interface is physical.

8. The system of claim 1, wherein each of the N signal repeaters comprises a Darlington transistor pair.

9. The system of claim 1, wherein each of the N regulators comprises a Zener diode.

10. The system of claim 1, wherein the electronically controlled components are each exhaust gas recirculation valves.

11. A method comprising the steps of:
    providing, from a first source and to a first electronically controlled component, a control signal having a predetermined current at a predetermined voltage;
    generating, from a second source, current sufficient to supply the predetermined current at the predetermined voltage to N additional electronically controlled components, where N is an integer greater than or equal to 1;
    replicating the control signal, thereby generating N replicated control signals, one for each of the N additional electronically controlled components, such that the predetermined current at the predetermined voltage is applied as one of the N replicated controls signals to each of the N additional electronically controlled components at substantially the same time that the control signal is provided to the first electronically controlled component.

12. The method of claim 11, wherein each of the electronically controlled components is a valve, wherein the control signal is a pulse width modulated signal having an amplitude and a width, wherein the amplitude of the control signal represents the predetermined amount of current, and wherein the width of the control signal represents how open the valve is.

13. The method of claim 11, wherein the pulse width of the control signal is determined by an engine control module in an internal combustion engine.

14. The method of claim 11, further comprising the step of providing a serial interface between the N+1 electronically controlled components.

15. The method of claim 14, wherein the serial interface is physical.

16. The method of claim 11, further comprising the step of providing a parallel interface between the N+1 electronically controlled components.

17. The method of claim 16, wherein the parallel interface is physical.

18. The method of claim 11, further comprising the step of activating at least one of the N additional electronically controlled components.

19. The method of claim 11, further comprising the step of deactivating at least one of the N additional electronically controlled components.

* * * * *